Jan. 11, 1966  C. B. BROWN  3,228,476
AIRCRAFT SPINNER ASSEMBLY
Filed March 9, 1964  2 Sheets-Sheet 1
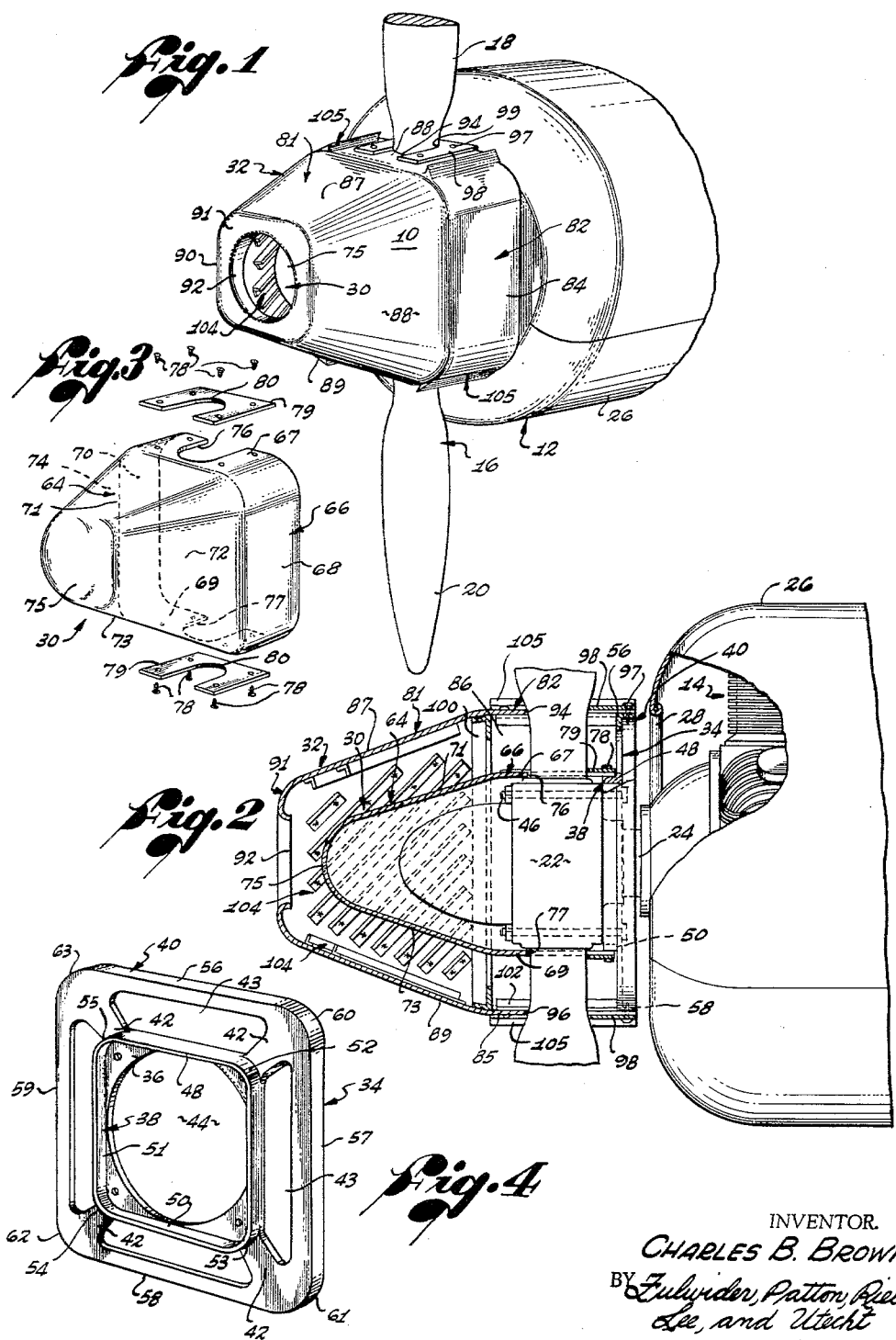
INVENTOR.
CHARLES B. BROWN
BY Fulwider, Patton, Rieber,
Lee, and Utecht
ATTORNEYS

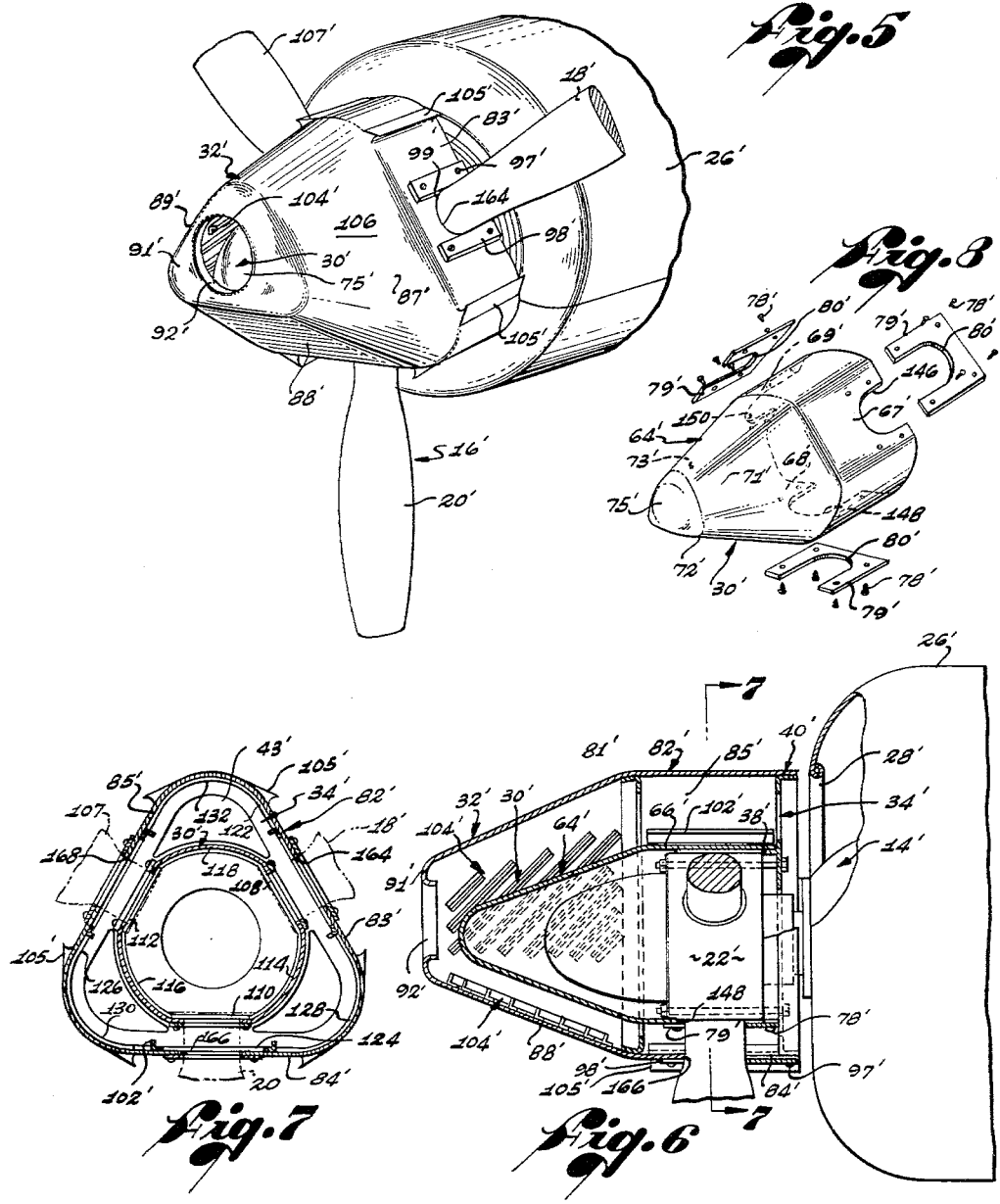

United States Patent Office 3,228,476
Patented Jan. 11, 1966

3,228,476
AIRCRAFT SPINNER ASSEMBLY
Charles B. Brown, 938 9th St., Santa Monica, Calif.
Filed Mar. 9, 1964, Ser. No. 350,215
14 Claims. (Cl. 170—135.743)

My invention relates to improvements in aircraft propeller assemblies and, more particularly, to a novel spinner design for use with multi-blade aircraft propellers.

The propeller assembly for a prop-driven aircraft generally includes a hub mounted securely on the drive shaft of the aircraft engine and a plurality of blades evenly spaced from each other and extending radially from the hub. Each blade includes an inner axial or root portion adjacent the hub and an intermediate or central portion radially adjacent the root portion. The central portions are generally shaped to form air foil sections while the root portions adjacent the hub are substantially straight and provide sturdy structural support for the blades to the hub.

An energizing of the aircraft engine produces a rotation of the drive shaft and with it a rotation of the propeller assembly. As the propeller assembly rotates, the central portions of the propeller blades travel at a substantially higher angular velocity than do the root portions. Due to the higher angular velocity and air foil design of the central portions, the central portions of the blades produce substantially the entire thrust force developed by the propeller assembly. Since it is generally desired to maximize the thrust producing capacity of propeller assemblies, the central air foil portions of the blades are carefully and critically designed. In practice, however, the actual improvement in thrust producing capacity which can be achieved by air foil design is restricted. In particular, for any given propeller assembly, the structural strength requirements of the propeller blades pose a distinct limitation upon the actual design of the overall propeller blades. Another limitation is presented by the inherent thrust-producing inefficiency of the root portions of the propeller blades.

To the present time, attempts to increase the thrust-producing capacity of aircraft propeller assemblies above their practical design limits have met with little success. Therefore, it is a primary object of my invention to provide means for improving the thrust-producing capacity of aircraft propeller assembly without weakening the structure of the propeller blades comprising the assembly.

Another object of my invention is to provide means for increasing the volume and density of air passing the highly efficient thrust-producing central portions of the blades of the propeller assembly thereby increasing the thrust-producing capacity of the propeller assembly.

A further object of my invention is to provide means for directing air from the low efficiency root portions to the highly efficient thrust-producing central portions of an aircraft propeller assembly to thereby increase the thrust-producing capacity of the overall propeller assembly.

A still further object of my invention is to provide means for simultaneously increasing the volume of air passing the central portions of the blades of an aircraft propeller assembly and directing a high velocity air stream from about the hub of the propeller assembly to the engine compartment of the associated aircraft engine to efficiently cool the engine.

The above, as well as other objects and advantages of my invention may be more clearly understood by reference to the following description when considered with the drawings in which:

FIGURE 1 is a perspective view of one form of my invention in combination with a propeller assembly having two blades;

FIGURE 2 is a sectional side view of the apparatus illustrated in FIGURE 1 partially broken away to show a portion of the aircraft engine;

FIGURE 3 is a perspective view of the inner member of the apparatus illustrated in FIGURE 1;

FIGURE 4 is a perspective view of a bracket for supporting the apparatus illustrated in FIGURE 1 about the hub of the associated propeller assembly;

FIGURE 5 is a perspective view of another form of my invention in combination with a propeller assembly having three blades;

FIGURE 6 is an axial sectional view of the apparatus illustrated in FIGURE 5;

FIGURE 7 is a sectional view along the lines 7—7 in FIGURE 6 with the propeller and hub omitted; and FIGURE 8 is a perspective view of the inner member of the apparatus illustrated in FIGURE 5.

Generally speaking to accomplish the foregoing objects, my invention comprises a novel aircraft spinner for covering the front of an aircraft engine and the hub and inner-root portions of an associated propeller assembly. In outward appearance, the spinner of my invention resembles a frustum of a cone, pyramid or other conically shaped member having a plurality of substantially flat side walls. Accordingly the spinner may be termed "frustum-shaped." The spinner is adapted to rotate with the propeller assembly and simultaneously pumps air in a high velocity stream to the engine and deflects air radially outward to the central and outer portions of the propeller blades.

The streamlined exterior of the spinner materially reduces the drag forces normally acting on the aircraft while the high velocity air stream pumped to the engine either provides for efficient cooling of the aircraft engine or improves its efficiency of operation depending upon whether the engine is of an air-cooled piston type or of turbo-prop construction.

The air deflected radially outward from the spinner performs two important functions. First, the deflected air acts against and prevents air from migrating inwardly along the propeller blades, thus increasing the operating efficiency of the propeller assembly. Second, the deflected air materially increases the amount and density of air passing the central air foil portions of the propeller blades to substantially increase the thrust developed by the propeller assembly.

In FIGURES 1 through 4, my frustum-shaped spinner is represented by the numeral 10 and is illustrated in combination with a two-blade propeller-engine assembly 12. By way of example only, engine-propeller assembly 12 comprises an air-cooled piston engine 14 and a propeller assembly 16 having a pair of blades 18 and 20 extending radially outward from opposite sides of a hub 22. The hub 22 is fixedly secured for rotation with a drive shaft 24 extending forward from the engine 14.

To streamline the engine 14 and to reduce drag forces thereon, the engine is surrounded by a cowling 26 having a forward opening 28 about the hub 22. The spinner 10 coaxially surrounds the hub 22 and covers a major portion of the roots of the blades 18 and 20 and the forward opening 28 in the cowling. The spinner 10, being of streamlined appearance, smooths the air flow around the hub and together with the cowling substantially reduces the drag forces otherwise acting on the engine assembly.

Basically, the spinner 10 comprises three fundamental elements, namely, an inner spinner 30, an outer spinner 32, and a mounting bracket 34.

The mounting bracket 34 functions to provide rigid and coaxial support for the inner and outer spinners 30 and 32 about the hub 22 and is preferably formed from a light-weight metal having high tensile and compressive strengths. As illustrated most clearly in FIGURE 4, the mounting bracket 34 comprises a back plate 36, an inner, forwardly extending flange 38, and a similar outer, rearwardly extending flange 40 supported coaxially about the flange 38 by a plurality of arms 42 to define a plurality of elongated side openings 43. The back plate 36 includes a central opening 44 for coaxially receiving the drive shaft 24 to allow the mounting bracket to be fixedly secured to the rear side of the hub 22 by a plurality of bolts, 46.

With the mounting bracket 34 secured to the hub 22, the flange 38 extends forward from the back plate 36 around the periphery of the hub and behind the roots of the propeller blades 18 and 20. The flange 38 is adapted to provide rigid mounting support for the inner spinner 30 coaxially about the hub 22 and in its preferred form is substantially square having four flat sides 48, 49, 50 and 51 of equal length joined by curved corner sections 52, 53, 54 and 55, respectively. Preferably, the blades 18 and 20 bisect the mounting bracket 34 with the flat sides 48 and 50 located directly behind and normal to the roots of the propeller blades 18 and 20 respectively, and the opposing flat sides 49 and 51 extending substantially parallel to the propeller blades.

Like the flange 38, the flange 40 is continuous and with the mounting bracket 34 fixedly secured to the hub 22, extends rearward from the back plate 36 around the periphery of the central opening 28 in the cowling 26. The flange 40 is adapted to provide rigid mounting support for the outer spinner 32 coaxially about the hub 22 and in its preferred form is substantially square having four flat sides 56, 57, 58 and 59 of equal length joined by curved corner sections 60, 61, 62 and 63, respectively. The flat sides 56 and 58 lie directly behind and normal to the roots of the propeller blades 18 and 20 while the opposing flat sides 57 and 59 extend substantially parallel to the flat sides 49 and 51 of the flange 38.

As represented in FIGURES 2 and 3, the inner spinner 30 is hollow and includes a substantially frusto-pyramidal front portion 64 extending forward from a substantially square open, box-like rear portion 66. The inner spinner 30 is preferably composed of a lightweight metal or a strong plastic and may be of a single-piece construction. However, as with the outer spinner 32, the inner spinner 30 may be formed from several sheets of metal welded or otherwise securely held together. The open end portion 66 is shaped to fit tightly around the forwardly extending flange 38 of the bracket 34 and includes four flat sidewalls 67, 68, 69 and 70 joined by curved corner sections. The base of the frusto-pyramidal front portion 64 follows the contour of the open rear portion 66 with flat sidewalls 71, 72, 73 and 74 extending forward from the sidewalls 67, 68, 69 and 70, respectively, and converging to a curved nose section 75. Like the open end portion 66, the flat sidewalls of the forward portion 64 are joined by curved edge sections which are continuous with the corresponding curved corners of the open rear portion. The rear ends of the flat sidewalls 67 and 69 of the rear portion 66 include centrally located cutouts 76 and 77 which allow the inner spinner 30 to fit closely around the roots of the propeller blades 18 and 20 and over the outer surface of the flange 38 with the flat sidewalls 67 and 69 of the open rear portion substantially normal to the blades 18 and 20 respectively, and the blades in line with centerlines of the corresponding flat sidewalls 71 and 73 of the front portion 64.

Thus positioned, the inner spinner 30 is secured to the flange 38 by a plurality of screws 78 to provide a fixed, streamlined, coaxial cover for the hub 22 of the propeller assembly. To complete the cover over the hub 22, cover plates 79 having semi-circular cutouts 80 may be secured to the inner spinner 30 closely about the roots of the blades by the screws 78. The cover plates 79 combine with the cutouts 76 and 77 to act as a seal to keep air from escaping down the propeller blades.

Similar to the inner spinner 30, the outer spinner 32 may be formed from a lightweight metal or strong plastic material and is preferably of a single-piece construction. As illustrated most clearly in FIGURES 1 and 2, the outer spinner 32 is hollow and includes a substantially frusto-pyramidal front portion 81 extending forward from a substantially square, open, box-like rear portion 82. The open rear portion 82 is shaped to fit tightly around the rearward extending flange 40 of the bracket 34 and includes four flat sidewalls 83, 84, 85 and 86 joined by curved corner sections. The base of the frusto-pyramidal front portion 81 follows the contour of the open, rear portion 82 with flat sidewalls 87, 88, 89 and 90 extending forward from the sidewalls 83, 84, 85 and 86, respectively, and converging to a nose section 91. The nose section 91 is generally flat and includes a central circular opening 92. Like the open rear portion 82, the flat sidewalls of the forward portion 81 are joined by curved edge sections which are continuous with corresponding curved corners of the open rear portion. The rear ends of the flat sidewalls 83 and 85 of the open end portion 82 include centrally located cutouts 94 and 96 which allow the outer spinner 32 to fit closely around the roots of the blades 18 and 20 and over the outer surface of the flange 40 with the flat sidewalls 83 and 85 of the end portion 82 extending substantially normal to the blades 18 and 20 respectively, and the blades in line with centerlines of the corresponding flat sidewalls 87 and 89 of the forward portion 81.

Thus positioned, the outer spinner 32 is secured to the flange 40 by a plurality of screws 97 to provide a fixed, streamlined, coaxial cover for the forward face of the engine 14 and the roots of the propeller blades 18 and 20. To complete the coaxial cover, cover plates 98 having semi-circular cutouts 99 may be secured to the outer spinner 32 closely about the roots of the blades by the screws 97. The cover plates 98 combine with the cutouts 94 and 96 to act as a seal to keep air from escaping down the propeller blades.

To provide additional structural support for the outer spinner 32, a rigid brace member 100 extends circumferentially around the inner surface of the outer spinner at a junction of the front and rear portions 81 and 82 slightly forward of the roots of the propeller blades 18 and 20. Further, a plurality of rigid stringers 102 are secured to extend horizontally along the inner surface of the rear portion 82 of the outer spinner from the brace member 100 to the mounting bracket 34. Fixably secured to the inner surface of each of the substantially flat sidewalls 87, 88, 89 and 90 of the outer spinner is a like group of rigid L-shaped members 104.

As illustrated most clearly in FIGURE 2, the L-shaped members 104 of each group are evenly spaced from each other and extend diagonally across a center line of their associated sidewall. In the preferred arrangement of the inner and outer spinners 30 and 32 on the mounting bracket 34, the inner surfaces of the flat sidewalls of the outer spinner lie opposite and substantially parallel to corresponding flat sidewalls of the inner spinner. Therefore, the L-shaped members 104 of each group also lie opposite a flat sidewall of the inner spinner.

The L-shaped members 104 perform a number of different important functions. As previously mentioned, the L-shaped members 104 reinforce the substantially flat sidewalls of the outer spinner 32. In addition, however, the L-shaped members act as vanes or fan blades and together with the flat sidewalls of the inner spinner 30 aid in developing and directing a high velocity airstream through the space between the inner and outer spinners to the engine 14. More particularly, due to the fixed coupling of the mounting bracket 34 with the inner and outer spinners 30 and 32 to the hub 22, the aircraft spinner 10 rotates with the propeller assembly 16. As the spinner assembly 10 rotates and the associated aircraft moves through the atmosphere, air flows smoothly through the central opening 92 in the nose 91 of the outer spinner 32 and contacts the streamlined surface of the inner spinner 30. With rotation of the inner spinner 30, the sidewalls 67, 68, 69 and 70 function as flat surfaces of a fan to effectively throw air outward to contact the L-shaped members 104. The members 104 in rotating with the outer spinner 32 act as vanes or fan blades to effectively pump the air rearward through the openings 43 in the back plate 36 and create a high-velocity airstream from the spinner assembly through the opening 28 in the cowling 26. In the air-cooled piston engine 14, the high-velocity airstream provides means for transporting heat from the engine through variable air outlets in the cowling 26 (not shown) to increase the overall operating efficiency of the engine. If instead of comprising a piston engine, the engine of the aircraft includes the turbo-prop engine driving the propeller assembly 16, the high-velocity stream of dense air operates upon the turbine blades of the engine to increase its efficiency of operation.

In addition to producing the high-velocity airstream, the air deflected from the flat sidewalls of the inner spinner 32 also exerts outward forces on the sidewalls 87, 88, 89 and 90 of the outer spinner 32 to counteract the inward forces exerted on the outer spinner by air contacting its outer surfaces. This equalizing of inward and outward forces on the outer spinner 32 allows the spinner assembly 10 to be composed of a lightweight material and reduces the structural support required for the spinner assembly and hence its cost of manufacture.

Simultaneous with the production of the high-velocity airstream, and as the aircraft travels through the atmosphere, air strikes the forwardly converging, reinforced, flat sidewalls 87, 88, 89, and 90 of the front portion 81 of the outer spinner 32 and passes over the flat sidewalls 83, 84, 85 and 86 of the rear portion 82. Rotation of the forwardly converging, flat sidewalls together with the forward movement of the aircraft produces an outward and rearward deflection and projection of the air to the central and extreme portions of the propeller blades 18 and 20. Rotation of the flat sidewalls of the rear portion 82 likewise produce an outward projection of air to the central and outer portions of the blades. Thus, in effect, the flat sidewalls of the outer spinner 32 act as surfaces of fan blades to push air outward to the more efficient propelling portions of the blades 18 and 20. The outward movement of air from the root portions to the central portions of the blades counteracts any inward travel of air along the propeller blades with rotation of the propeller assembly 16, increases the quantity of air passing the central portions of the propeller blades, and in effect, increases the density of air about the central and extreme portions of the blades. As the blades 18 and 20 rotate through the increased quantity of densified air, the thrust produced by the propeller assembly 16 is materially increased.

It is a feature of my invention that the amount of air projected outwardly by the flat sidewalls of the rear portion 82 of the outer spinner may be materially improved by the addition of a plurality of vanes 105 to the outer surface of the rear portion. The vanes 105 may extend along and form an integral part of the leading and trailing corners of the flat sidewalls 83 and 85 normal to the blades 18 and 20. By "leading corners" I mean the corners of the sidewalls 83 and 85 which precede the blades 18 and 20 as they rotate about the hub 22. By "trailing corners" I mean the corners of the flat sidewalls 83 and 85 which follow the blades 18 and 20 during rotation. Preferably, the vanes 105 are slightly concave relative to the blades. Thus, the vanes along the trailing corners are able to literally catch and propel air outward to the central portions of the blades as the spinner rotates while the vanes along the leading edges direct air over the flat sidewalls which, in turn, is projected outward by a rotation of the flat surfaces.

In summary then, the spinner assembly 10 illustrated in FIGURES 1 through 4 is of a lightweight and inexpensive construction and performs the dual functions of producing a high-velocity airstream for cooling an aircraft engine and at the same time forcing air radially outward from the inefficient proportions of the propeller to the highly efficient central proportions to produce an increase in the thrust developed by the propeller engine assembly.

A spinner assembly performing the foregoing dual functions for a propeller having three blades is illustrated in FIGURES 5 through 8. The spinner assembly is represented generally by the numeral 106 and is substantially frusto-pyramidal in outward appearance.

The spinner assembly 106 is very similar to the spinner assembly 10 previously described. Therefore the detailed description of the spinner assembly 106 will be limited to a description of the structural and functional differences between the spinner assemblies 106 and 10 and a prime (') notation will be utilized to represent like elements illustrated in FIGURES 1 through 4.

Basically, the spinner assembly 106 includes an inner spinner 30', an outer spinner 32', and a mounting bracket 34'. The mounting bracket 34' is coaxial with and fixedly secured to the rear face of a hub 22' of a propeller assembly 16' and includes an inner, forwardly extending flange 38' and an outer rearwardly extending flange 40'. The flange 38' is substantially triangular in shape and includes flat side portions 108, 110, and 112 joined by curved portions 114, 116, and 118. The flange 38' extends around the rear periphery of the hub 22' with the flat side portions 108, 110 and 112 being bisected by and lying substantially normal to the rear portions of the blades 18', 20' and 107 of the propeller assembly 16'.

The flange 40' is also preferably triangular in shape having flat side portions 122, 124 and 126 parallel to and equally spaced from the flat side portions 108, 110 and 112 of the forwardly extending flange 38'. The flat side portions 122, 124 and 126 are joined by curved portions 128, 130 and 132 and extend behind and normal to the root portions of the blades 18', 20' and 107.

The forwardly extending flange 38' provides rigid mounting support for the inner spinner 30'. The inner spinner 30' is hollow and includes a substantially frusto-pyramidal front portion 64' extending forward from the substantially triangular, open, box-like rear portion 66'. The open rear portion 66' is shaped to fit tightly around a forwardly extending flange 38' and includes three flat sidewalls 67', 68' and 69' joined by curved corner sections. The base of the frusto-pyramidal front portion 64' follows the contour of the open rear portion 66' with flat sidewalls 71', 72' and 73' extending forward from the sidewalls 67', 68' and 69', respectively, and converging to a curved nose section 75'. Like the open end portion 66', the flat sidewalls of the forward portion 64' are joined by curved edge sections which are continuous with corresponding curved corners of the open rear portion. The rear ends of the flat sidewalls of the rear portion 66' include centrally located cutouts 146, 148 and 150 which allow the inner spinner 30' to fit closely around the roots of the blades 18', 20' and 107 and over the outer surface of the flange 38' with the flat sidewalls of the rear portion substantially normal to the blades 18', 20', and 107 respectively, and the blades aligned with the centerlines of the corresponding forwardly converging sidewalls of the front portion 64'.

Thus positioned, the inner spinner 30' is secured to the flange 38' by a plurality of screws 78' to provide a fixed, streamlined and coaxial cover for the hub 22' of the propeller assembly. To complete the cover on the hub 22', cover plates 79' having semi-circular cutouts 80' may be secured to the inner spinner 30' closely about the roots of the blades by the screws 78'. The cover plates 79' combine with the cutouts 146, 148, and 150 to act as a seal to keep air from escaping down the propeller blades.

The rearwardly extending flange 40' provides rigid mounting support for the outer spinner 32' coaxially about the inner spinner 30' and the hub 22'. As illustrated most clearly in FIGURES 5 and 6, the outer spinner 32' is hollow and includes a substantially frusto-pyramidal front portion 81' extending forward from a substantially triangular, open, box-like rear portion 82'. The open rear portion 82' is shaped to fit tightly around the rearward extending flange 40' and includes three flat sidewalls 83', 84' and 85' joined by curved corner sections. The base of the frusto-pyramidal front portion 81' follows the contour of the open rear portion 82' with flat sidewalls 87', 88' and 89', extending forward from the sidewalls 83', 84' and 85', respectively, and converging to a nose section 91'. The nose section 91' is generally flat and includes a central circular opening 92'. Like the open end portion 82', the flat sidewalls of the forward portion 81' are joined by curved edge sections which are continuous with corresponding curved corners of the open rear portion. The rear ends of the flat sidewalls of the open rear portion include centrally located cutouts 164, 166 and 168, respectively, which allow the outer spinner 32' to fit closely around the roots of the propeller blades and tightly over the outer surface of the flange 40' with the flat sidewalls 83', 84', and 85' of the open end portion substantially normal to the blades 18', 20' and 107 respectively, and the blades aligned with centerlines of the corresponding flat sidewalls of the front portion 81' extending forward from the rear portion.

Thus positioned, the outer spinner 32' is secured to the flange 40' by a plurality of screws 97' to provide a fixed streamlined coaxial cover for deflecting air rearward and outwardly from the hub 22' and the front wall of the engine 14'. To complete the coaxial cover, cover plates 98' having semi-circular cutouts 99' may be secured to the outer spinner 32' closely about the roots of the blades by the screws 97'. The cover plates 98' combine with the cutouts 164, 166 and 168 to act as a seal to keep air from escaping down the propeller blades.

The additional structural support for the outer spinner 32' is substantially as described in connection with FIGURES 1 through 4 and includes a group of rigid L-shaped members 104' secured to the inner surface of each of the forwardly converging, flat sidewalls of the outer spinner.

In the preferred arrangement of the inner and outer spinners 30' and 32' on the mounting bracket 34', the inner surfaces of the flat sidewalls of the outer spinner 32' lie opposite and substantially parallel to corresponding flat sidewalls of the inner spinner 30'. Therefore, the L-shaped support members of each group also lie opposite a flat sidewall of the inner spinner and as previously described perform a number of different important functions. By way of summary, the L-shaped members 104' reinforce the forwardly converging sidewalls of the outer spinner 32' against air pressure acting inward on the sidewalls of the spinner. Also, the L-shaped members function as vanes or fan blades and together with the forwardly converging sidewalls of the inner spinner provide means for developing and directing a high-velocity airstream through the openings 43' rearward to the engine 14'.

More particularly, in operation, as the spinner assembly 106 rotates with the hub 22' and the associated aircraft moves through the atmosphere, air strikes the forwardly converging, reinforced, flat sidewalls 87', 88', and 89' of the outer spinner 32'. Rotation of the forwardly converging sidewalls together with the forward movement of the aircraft produces a radially outward and slightly rearward deflection of the air to the central and extreme portions of the blades from the propeller assembly 16'. This movement of air is materially aided by the rotation of the flat sidewalls of the rear portion 82' of the outer spinner 32 and may be further increased by the addition of the vanes 105' to the exterior of the rear portion along the leading and trailing corners of the flat sidewalls 83', 84', and 85'. In effect, the sidewalls of the outer spinner 32' act as surfaces of a fan blade and push air radially outward to the more efficient propelling portions of the propeller blades. This has the effect of materially increasing the thrust force developed by the propeller assembly 16'.

Simultaneous with the outward deflection of the air by the outer spinner 32', air smoothly enters the central circular opening 92' in the nose 91' of outer spinner 32' and contacts the streamlined outer surface of the inner spinner 30'. With rotation of the inner spinner 30', the flat sidewalls thereof function as surfaces of a fan to effectively throw air outward to impinge upon the vanes defined by the L-shaped members 104'. The vanes in rotating with the outer spinner 32' effectively pump air rearward through the spinner assembly 106 and create a high-velocity airstream from the spinner assembly through the opening 28' in the cowling 26'. As previously described, depending upon whether the aircraft engine is an air-cooled, piston engine or a turbo-prop engine, the high-velocity airstream either functions to cool the engine or to increase its efficiency of operation.

As in the spinner assembly 10, the air deflected from the flat sidewalls of the inner spinner 30' to form the high-velocity airstream also exerts outward forces on the sidewalls of the outer spinner 32' to counteract inward forces exerted on the outer spinner by air contacting its outer surfaces. This equalizing of inward and outward forces on the outer spinner 32' allows the spinner assembly 106 to be composed of a lightweight material and reduces the structural support required for the spinner assembly and hence its cost to the manufacturer.

In view of the foregoing, the spinner assembly 106, like the spinner assembly 10 is of lightweight and inexpensive construction and performs the dual functions of producing high-velocity airstream for cooling an aircraft engine and at the same time forcing air radially outward from the inefficient root portions of the propeller to the highly efficient central portions to produce an increase in the thrust force developed by the propeller-engine assembly.

Although specific embodiments of aircraft spinner assemblies have been described in detail, it should be borne in mind that numerous modifications of the illustrated designs are possible without departing from the scope of my invention. For example, in each embodiment, the inner and outer spinners are illustrated as having forwardly converging flat sidewalls joined by curved sections. Also the flat sidewalls are arranged to extend normal to the blades of the associated propeller assembly. In some arrangements of my invention however, the curved sections may be substantially flat and in other arrangements the curved sections may extend around the blades rather than the flat sidewalls. In view of the foregoing, I intend that my invention be limited in scope only by the following claims.

I claim:
1. In an aircraft propeller assembly having a hub axially coupled to an aircraft engine and a plurality of blades extending radially outward from said hub, the combination of:
   a hollow spinner member having a continuous outer surface for surrounding said hub and having a plurality of substantially flat forwardly converging outer sidewalls extending forward of said hub;
   and means for rigidly supporting said spinner for rotation with said hub.
2. The combination of claim 1 wherein substantially flat, forwardly converging sidewalls have rear ends which extend substantially normal to said blades.
3. A spinner for a multi-blade aircraft propeller assembly, comprising:
   an inner substantially cone-shaped spinner member having an open rear end for axially receiving and covering the hub of said propeller assembly;

an outer, substantially hollow spinner member having an opening in its nose and an open rear end for axially receiving and surrounding said inner spinner, said outer spinner having a plurality of substantially flat forwardly converging sidewalls;

means extending from a inner surface of at least one of said substantially flat sidewalls of said outer spinner for propelling air rearward through said outer spinner;

and means for rigidly and coaxially supporting said outer spinner and said inner spinner about said hub.

4. The spinner of claim 3 wherein substantially flat forwardly converging sidewalls have rear ends which extend substantially normal to the blades of said propeller assembly.

5. A spinner for a multi-blade aircraft propeller assembly, comprising:

an inner substantially cone-shaped spinner member having an open rear end for axially receiving and covering the hub of said propeller assembly;

an outer, hollow spinner member having an opening in its nose and an open rear end for axially receiving and surrounding said inner spinner, said outer spinner having a plurality of substantially flat forwardly converging sidewalls;

and means for rigidly and coaxially supporting said outer spinner and said inner spinner about said hub.

6. In an aircraft propeller assembly having a hub coupled to an aircraft engine and a plurality of blades extending radially outward from said hub, the combination of:

an inner, substantially pyramid-shaped spinner member having an open rear end for axially receiving and covering said hub;

an outer, hollow, substantially frustum-shaped spinner member having a central opening in its front portion and an open rear for receiving and coaxially surrounding said inner spinner, said outer spinner having a plurality of substantially flat forwardly converging sidewalls;

a plurality of vanes rigidly secured to and extending across the inner surface of at least one of said substantially flat sidewalls of said outer spinner for propelling air rearward through said outer spinner;

and mounting means for rigidly and coaxially supporting said outer spinner and said inner spinner about said hub.

7. In an aircraft propeller assembly having a hub coupled to an aircraft engine and a plurality of blades extending radially outward from said hub, the combination of:

an inner, substantially pyramid-shaped spinner member having an open rear end for axially receiving and covering said hub, said inner spinner having substantially flat side walls with rear ends substantially normal to said blades;

an outer, hollow, substantially frustum-shaped spinner member having a central opening in its front portion and an open rear for receiving and coaxially surrounding said inner spinner, said outer spinner having substantially flat forwardly converging sidewalls with rear ends substantially normal to said blades;

a plurality of vanes rigidly secured to and extending across inner surfaces of at least one of said substantially flat sidewalls of said outer spinner for propelling air rearward through said outer spinner;

and mounting means for rigidly and coaxially supporting said outer spinner and said inner spinner about said hub with each of said substantially flat sidewalls of said inner spinner opposite an inner surface of a corresponding one of said substantially flat sidewalls of said outer spinner.

8. The combination of claim 7 wherein said outer spinner is substantially frusto-pyramidal in shape.

9. In an aircraft propeller assembly having a hub coupled to an aircraft engine and a plurality of blades extending from said hub, the combination of:

an inner, substantially pyramid-shaped spinner member having an open rear end for axially receiving and covering said hub, said inner spinner having cutouts for receiving root portions of said blades and substantially flat forwardly converging sidewalls evenly spaced from each other with rear ends substantially normal to said blades;

an outer, hollow, substantially frustum-shaped spinner member having an open front and an open rear for coaxially surrounding said inner spinner, said outer spinner having cutouts for receiving root portions of said blades and substantially flat forwardly converging sidewalls evenly spaced from each other with rear ends substantially normal to said blades;

a plurality of groups of vanes, each group being rigidly secured to and extending diagonally across an inner surface of a different one of said substantially flat sidewalls of said outer spinner for propelling air rearward through said outer spinner;

and bracket means for rigidly and coaxially supporting said outer spinner and said inner spinner about said hub with each of said substantially flat sidewalls of said inner spinner opposite and substantially parallel to an inner surface of a corresponding one of said substantially flat sidewalls of said outer spinner.

10. In an aircraft propeller assembly having a hub axially coupled to an aircraft engine and a plurality of blades extending radially outwardly from the hub, the combination of:

a hollow spinner member including an open, box-like rear portion for centrally receiving and surrounding said hub, said rear portion having substantially flat outer sidewalls, and a substantially frustum-shaped front portion extending forward from said rear portion and having substantially flat, forwardly converging outer side walls extending from and continuous with corresponding outer sidewalls of said rear portion;

and means for rigidly supporting said spinner member for rotation with said hub with flat sidewalls of said rear portion substantially normal to said propeller blades.

11. In an aircraft propeller assembly having a hub axially coupled to an aircraft engine and a plurality of blades extending radially outward from the hub, the combination of:

a hollow spinner member including an open, box-like rear portion for axially receiving and surrounding said hub, said rear portion having substantially flat outer sidewalls, and an open ended substantially frusto-pyramidal front portion extending forward from said rear portion and having substantially flat, forwardly converging side walls extending from and continuous with corresponding flat sidewalls of said rear portion;

means for rigidly supporting said spinner member for rotation with said hub with flat sidewalls of said rear portion substantially normal to said propeller blades;

and a plurality of vanes extending from an inner surface of at least one of said substantially flat, forwardly converging sidewalls for propelling an airstream rearward through said spinner member.

12. The apparatus of claim 11 including an outer vane extending along a corner of said rear portion of said spinner member.

13. In an aircraft propeller assembly having a hub axially coupled to an aircraft engine and a plurality of blades extending radially outward from said hub, the combination of:

a hollow, substantially pyramid-shaped inner spinner having substantially flat, forwardly converging sidewalls and an open rear end for receiving and coaxially surrounding said hub;

a hollow outer spinner member including an open, box-like rear portion for axially receiving and surrounding said inner spinner member, said rear portion having substantially flat sidewalls, and an open, substantially frusto-pyramidal front portion extending forward from said rear portion and having substantially flat, forwardly converging sidewalls extending from and continuous with corresponding flat sidewalls of said rear portion;

a plurality of vanes extending from an inner surface of at least one of said substantially flat, forwardly converging sidewalls for propelling an airstream rearward through said outer spinner member;

and means for rigidly and coaxially supporting said inner and outer spinner members for rotation with said hub with corresponding flat sidewalls of said inner and outer spinner members substantially normal to said blades and parallel to each other.

14. The apparatus of claim 13 including an outer vane extending along a corner of said rear portion of said outer spinner member substantially normal to said blades.

References Cited by the Examiner

UNITED STATES PATENTS

| | | | |
|---|---|---|---|
| 1,908,820 | 5/1933 | Chilton | 170—135.743 |
| 2,378,125 | 6/1945 | Bowman | 170—135 |
| 2,411,143 | 11/1946 | Aglizier | 170—159 |
| 2,509,442 | 5/1950 | Matheisel | 170—135 X |

FOREIGN PATENTS

| | | |
|---|---|---|
| 162,066 | 4/1921 | Great Britain. |
| 421,528 | 6/1934 | Great Britain. |
| 551,556 | 3/1943 | Great Britain. |

MARK NEWMAN, *Primary Examiner.*

JULIUS E. WEST, *Examiner.*